UNITED STATES PATENT OFFICE.

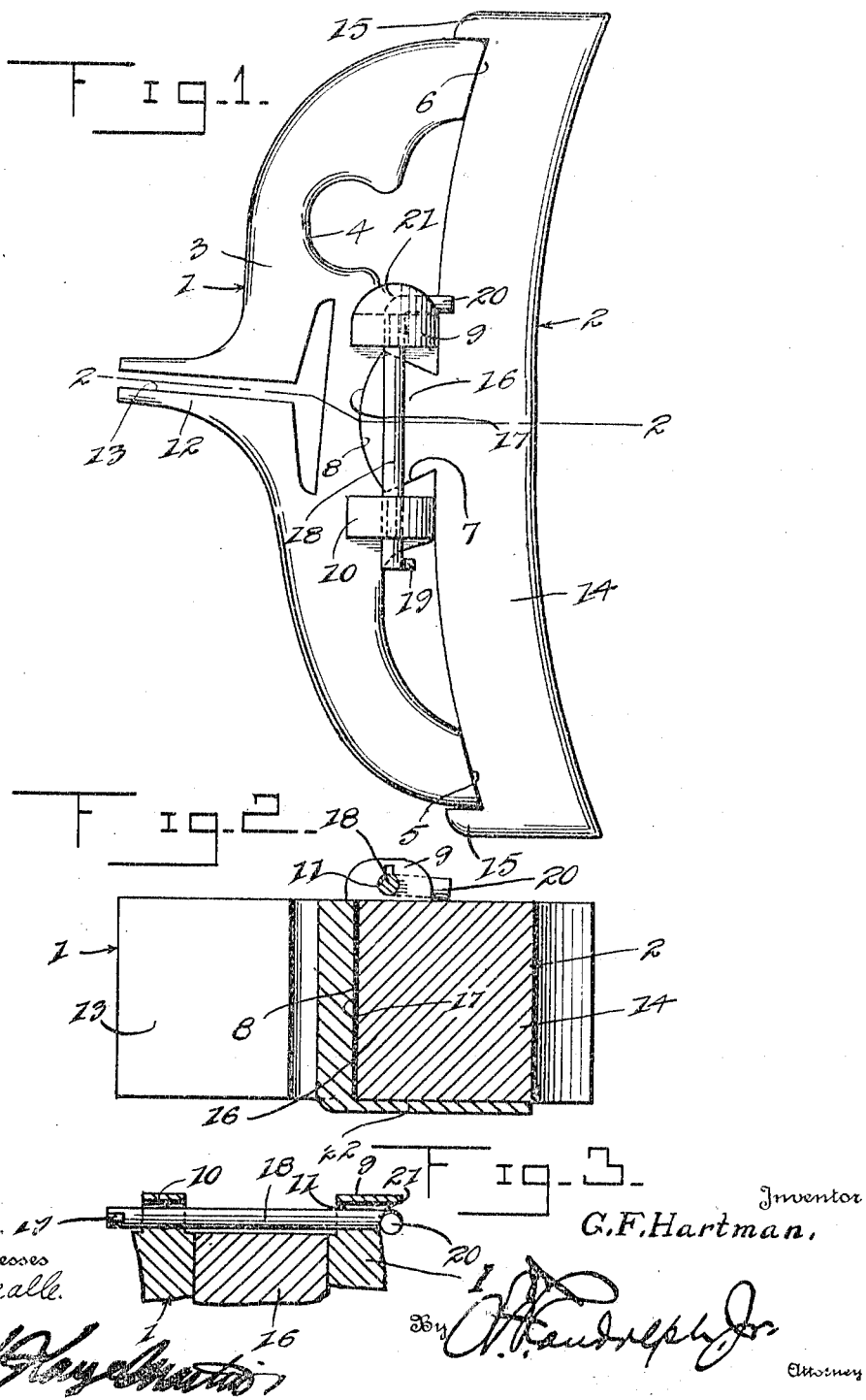

GEORGE F. HARTMAN, OF ONEONTA, NEW YORK.

BRAKE HEAD AND SHOE FOR FREIGHT-CARS.

1,116,271.   Specification of Letters Patent.   Patented Nov. 3, 1914.

Application filed February 18, 1914. Serial No. 819,450.

*To all whom it may concern:*

Be it known that I, GEORGE F. HARTMAN, a citizen of the United States, residing at Oneonta, in the county of Otsego and State of New York, have invented certain new and useful Improvements in Brake Heads and Shoes for Freight-Cars; and I do hereby declare the following to be a full, clear, and exact description of the invention, such as will enable others skilled in the art to which it appertains to make and use the same.

This invention relates to new and useful improvements in brake heads and shoes, and has for its principal object to provide a brake head from which the shoe may be easily and quickly detached and a new shoe placed thereon.

A still further object of this invention is to provide a brake head which is simple in construction, cheap to manufacture, and durable in use, and which may be easily and quickly attached to the ordinary type of brake beam.

With the above and other objects in view, the invention consists in the novel combination and arrangement of parts which will be fully set forth in the following specification and accompanying drawings, in which, Figure 1 is a side view in elevation of a brake head and shoe constructed in accordance with this invention. Fig. 2 is a transverse sectional view taken on line 2—2 of Fig. 1, and Fig. 3 is a detail sectional view of the locking pin showing the means for holding the same in position.

Referring now to the drawings by characters of reference, the numeral 1 designates as an entirety the brake head, while the numeral 2 designates the brake shoe. This brake head comprises the main body portion 3 which is recessed as at 4 to receive the hanger. The ends of the body portion are bent as clearly shown in Fig. 1 and terminate in the faces 5 and 6, against which the brake shoe, which will be fully hereinafter described, rests. Intermediate the ends of the head and on the same side as the faces 5 and 6 is provided the dove tail groove 7 which is provided with the rounded rear wall 8 as clearly shown in Fig. 1. A pair of ears 9 and 10 are formed integral with the body portion and are provided with the key hole slots 11, the use of which will appear hereinafter. An extension 12 is formed on the body portion intermediate its ends and substantially in alinement with the dove tail groove, said extension being preferably slotted as at 13 to receive the T section which forms the brake beam.

The brake shoe previously referred to by the numeral 2, preferably comprises the arcuate body portion 14 having the angular extension 15 formed at each end, said angular extension being adapted to overlie a portion of the brake head when the brake shoe is in place. A suitable dove tail extension 16 is formed on the brake shoe intermediate its ends and in direct alinement with the dove tail groove in the brake head, said extension being provided with the curved outer wall 17 as clearly shown in Fig. 1. A pin 18 is provided and has formed integral with one end the angular extension 19 which is adapted to register with the reduced portion of the key hole slot in the ears 9 and 10 to permit the pin to be withdrawn. The end of the pin opposite the angular extension 19 is bent as at 20 and is adapted to lie between the extension 21 formed on the ear 9 and the body portion of the brake head.

A suitable stop 22 is formed on the side of the brake head opposite the side carrying the ears 9 and 10 and is arranged to prevent the brake shoe from passing entirely across the face of the brake head.

It will be evident from the foregoing that in use the brake head is secured to the brake beam in the usual manner and when it is desired to place a shoe on the brake head the pin 18 is withdrawn and the dove tail extension on the brake shoe brought in direct alinement with the dove tail slot in the brake head, and upon forcing the shoe toward the stop 22 it will be apparent that the extensions 15 will overlie the ends of the brake head as shown in Fig. 1. After the brake shoe has been forced to its full extent in place, the pin 18 is again inserted through the key hole slot in the ears 9 and 10, and it will be evident that the brake shoe will be held from displacement. Should it be desired to replace the brake shoe at any time, the same operation may be gone through and it will be apparent that with this invention a particularly simple and effective device is provided whereby the brake shoes may be easily and quickly interchanged without inconveniencing the user in any way.

While in the foregoing there has been shown and described the preferred embodiment of this invention, it is to be understood that such changes may be made in the combination and arrangement of parts as will fall within the spirit and scope of the invention as claimed.

Having thus described my invention, I claim:

A device of the character described including a brake head, bearing surfaces formed at each end of the brake head, said brake head being provided with a centrally located transversely extending dove tail groove, the said groove being of uniform width throughout its entire length, a brake shoe adapted to seat against the bearing surfaces, a centrally located transversely extending dove tail extension formed on the brake shoe, said extension being arranged to enter the dove tail groove in the brake head and also being of uniform dimensions throughout its entire length, a stop formed on one end of the dove tail groove in the brake head, said stop being arranged to limit the lateral movement of the brake shoe with relation to the head, ears carried by the brake head on the side opposite the stop, said ears being adjacent to the dove tail groove, each of said ears being provided with a key hole slot, an upstanding member formed at the free ends of the uppermost ear, said upstanding member forming a groove between the outer end of the ear and the brake head and a pin arranged to pass through the key hole slot in each of the ears to prevent the brake shoe from becoming disengaged, the said pin being provided with an angular extension to lie in the groove between the upstanding member on the ear and the brake head to prevent the same from being accidentally engaged.

In testimony whereof I affix my signature in presence of two witnesses.

GEORGE F. HARTMAN.

Witnesses:
CHARLES H. BOWDISH,
SHELDEN H. CLORY.